(12) United States Patent
Wen et al.

(10) Patent No.: US 12,296,869 B2
(45) Date of Patent: May 13, 2025

(54) RAIL CORRUGATION RECOGNITION METHOD AND APPARATUS BASED ON SUPPORT VECTOR MACHINE, DEVICE, AND MEDIUM

(71) Applicant: Southwest Jiaotong University, Chengdu (CN)

(72) Inventors: Zefeng Wen, Chengdu (CN); Xiaolong Liu, Chengdu (CN); Xinbiao Xiao, Chengdu (CN); Shulin Liang, Chengdu (CN)

(73) Assignee: Southwest Jiaotong University, Chengdu (CN)

( * ) Notice: Subject to any disclaimer, the term of this patent is extended or adjusted under 35 U.S.C. 154(b) by 252 days.

(21) Appl. No.: 18/052,794

(22) Filed: Nov. 4, 2022

(65) Prior Publication Data

US 2023/0347948 A1 Nov. 2, 2023
US 2024/0182089 A9 Jun. 6, 2024

(30) Foreign Application Priority Data

Apr. 29, 2022 (CN) .......................... 202210464990.9

(51) Int. Cl.
*B61L 23/04* (2006.01)
*B61K 9/10* (2006.01)
(Continued)

(52) U.S. Cl.
CPC .......... *B61L 23/045* (2013.01); *G06F 18/214* (2023.01); *G06N 20/10* (2019.01);
(Continued)

(58) Field of Classification Search
CPC ................ B61L 23/045; G06N 20/10; G06N 2291/2623; G06N 2291/044; G06F 18/214; G01N 29/265; G01N 29/2493; B61K 9/10
(Continued)

(56) References Cited

U.S. PATENT DOCUMENTS

| | | | |
|---|---|---|---|
| 2023/0138810 A1* | 5/2023 | Taguchi | G06N 5/01 712/4 |
| 2023/0176016 A1* | 6/2023 | Liu | G01N 29/4472 702/39 |
| 2024/0182089 A9* | 6/2024 | Wen | G06F 18/2411 |

FOREIGN PATENT DOCUMENTS

| | | | | |
|---|---|---|---|---|
| CN | 110806324 A | * | 2/2020 | |
| CN | 111623868 A | * | 9/2020 | ............. G01B 11/02 |

(Continued)

OTHER PUBLICATIONS

Xie et al., Rail corrugation detection using one-dimensional convolution neural network and data-driven method, Measurement, May 24, 2022, pp. 1-13 (Year: 2022).*
(Continued)

*Primary Examiner* — Stephanie E Bloss
*Assistant Examiner* — Kevin C Butler
(74) *Attorney, Agent, or Firm* — Westman, Champlin & Koehler, P.A.

(57) ABSTRACT

The present disclosure discloses a rail corrugation recognition method and apparatus based on a support vector machine, a device, and a medium. The method includes: obtaining wheel-rail noise signals in different time periods, and obtaining wheel-rail noise time domain information; dividing the wheel-rail noise time domain information into segmented wheel-rail noise time domain information corresponding to each of the different time periods; preprocessing each piece of segmented wheel-rail noise time domain
(Continued)

information, and extracting a time domain statistical characteristic quantity and frequency domain eigenmode energy of each piece of segmented wheel-rail noise time domain information, to obtain a multi-dimensional wheel-rail noise characteristic vector; constructing a rail corrugation state recognition model based on a support vector machine, and training the rail corrugation state recognition model; and recognizing to-be-recognized wheel-rail noise data by using the rail corrugation state recognition model based on a support vector machine, to obtain a rail corrugation state.

17 Claims, 8 Drawing Sheets

(51) Int. Cl.
    *G01N 29/265*     (2006.01)
    *G06F 18/214*     (2023.01)
    *G06N 20/10*     (2019.01)

(52) U.S. Cl.
    CPC .............. *B61K 9/10* (2013.01); *G01N 29/265* (2013.01); *G01N 2291/044* (2013.01); *G01N 2291/2623* (2013.01)

(58) Field of Classification Search
    USPC .......................................................... 73/636
    See application file for complete search history.

(56) References Cited

FOREIGN PATENT DOCUMENTS

| | | | | | |
|---|---|---|---|---|---|
| CN | 111637964 | A | * | 9/2020 | ............. G01B 11/02 |
| CN | 112368200 | A | * | 2/2021 | .......... B61L 15/0081 |
| CN | 113420387 | A | * | 9/2021 | |
| CN | 113486874 | A | * | 10/2021 | |
| CN | 114169422 | A | * | 3/2022 | |
| CN | 114426038 | A | * | 5/2022 | |
| CN | 111460701 | B | * | 9/2022 | ........... G06K 9/6267 |
| CN | 116382209 | B | * | 10/2023 | |
| CN | 117253066 | A | * | 12/2023 | |
| CN | 118277788 | A | * | 7/2024 | |
| EP | 3792141 | A1 | * | 3/2021 | ................ B61F 5/50 |
| JP | 2012021790 | A | * | 2/2012 | |
| JP | 5433516 | B2 | * | 3/2014 | |
| WO | WO-2022134868 | A1 | * | 6/2022 | ............... B61K 9/10 |

OTHER PUBLICATIONS

Xu et al., Fault diagnosis method of wheelset based on EEMD-MPE and support vector machine optimized by quantum-behaved particle swarm algorithm, Measurement, Mar. 29, 2023, pp. 1-13 (Year: 2023).*

* cited by examiner

RAIL CORRUGATION RECOGNITION METHOD AND APPARATUS BASED ON SUPPORT VECTOR MACHINE, DEVICE, AND MEDIUM

CROSS REFERENCE TO RELATED APPLICATION

This patent application claims the benefit and priority of Chinese Patent Application No. 202210464990.9, filed with the China National Intellectual Property Administration on Apr. 29, 2022, the disclosure of which is incorporated by reference herein in its entirety as part of the present application.

TECHNICAL FIELD

The present disclosure relates to the field of intelligent recognition technologies for rail corrugation in urban rail transit, and specifically, to a rail corrugation recognition method and apparatus based on a support vector machine, a device, and a medium.

BACKGROUND

Rail wave wear (referred to as rail corrugation) has always been a critical issue in urban rail transit. In recent years, with the application of a large number of vibration-damping rails in a metro line and the increase of operation speed and load capacity of a metro vehicle, interaction force between a wheel and a rail is intensified, making rail corrugation more severe. Most of the damage to parts of the urban rail transit vehicle-rail system, such as fracture of elastic fastening and crack of the frame, are caused by severe rail corrugation. In addition, the severe rail corrugation can also bring strong vibration and noise, affecting the lives of residents along the line and the ride comfort of drivers and conductors. The most effective way to avoid or mitigate these problems is rail grinding. Currently, most metro operating units carry out planned maintenance on rail grinding according to specified operation time. However, a development law of rail corrugation is complex and closely related to a rail type and a train operation state, and the planned maintenance is often inconsistent with the development law of rail corrugation, resulting in the waste of operation and maintenance costs due to excessive grinding or frequent failures due to insufficient grinding. State maintenance is a maintenance plan based on a real-time train-rail operation state, which can avoid the increase of operation and maintenance costs and frequent faults to the greatest extent. Therefore, a quick diagnosis needs to be performed on rail corrugation in real time.

However, an existing intelligent rail corrugation recognition method has low recognition accuracy and low efficiency. Therefore, a rail corrugation method with high accuracy and high efficiency is urgently needed.

SUMMARY

The present disclosure aims to resolve a technical problem that recognition accuracy and efficiency are low in an existing intelligent rail corrugation recognition method. The present disclosure is intended to provide a rail corrugation recognition method and apparatus based on a support vector machine, a device, and a medium. In the method in the present disclosure, a characteristic vector is extracted from collected specific wheel-rail noise information generated when an urban rail transit vehicle moves at an uneven speed along a rail, and a support vector machine binary classification model is constructed, thereby acquiring an efficient and accurate recognition capability. The present disclosure can implement real-time on-line detection of rail corrugation, with the advantages of high efficiency, accuracy, high speed, and low operation and maintenance costs, thus promoting the development of operation and maintenance of rail transit towards convenience, intelligence, and efficiency.

The present disclosure is implemented by the following technical solutions:

According to a first aspect, the present disclosure provides a rail corrugation recognition method based on a support vector machine, where the method includes:

obtaining wheel-rail noise signals in different time periods, and obtaining wheel-rail noise time domain information according to the wheel-rail noise signals;

dividing the wheel-rail noise time domain information into segmented wheel-rail noise time domain information corresponding to each of the different time periods, and ensuring that each piece of segmented wheel-rail noise time domain information corresponds to an equal length of a moving path of an urban rail transit vehicle;

preprocessing each piece of segmented wheel-rail noise time domain information, and extracting a time domain statistical characteristic quantity and frequency domain eigenmode energy of each piece of segmented wheel-rail noise time domain information;

obtaining a multi-dimensional wheel-rail noise characteristic vector according to the time domain statistical characteristic quantity and the frequency domain eigenmode energy;

constructing a rail corrugation state recognition model based on a support vector machine according to the multi-dimensional wheel-rail noise characteristic vector, and training the rail corrugation state recognition model based on a support vector machine; and recognizing to-be-recognized wheel-rail noise data by using the rail corrugation state recognition model based on a support vector machine, to obtain a rail corrugation state, where the rail corrugation state includes a rail corrugation-free state and a rail corrugated state.

In the foregoing technical solution, time domain statistical characteristics of noise signals generated when an urban rail transit vehicle moves at an uneven speed along a rail in a fault state and a normal state are significantly different, and the time domain statistical characteristics have a strong ability to distinguish states of the urban rail transit vehicle. However, the time domain statistical characteristics are affected by many factors, such as a running speed and an operating environment of the urban rail transit vehicle, and frequency domain characteristics of noise signals in different states of the urban rail transit vehicle are less affected by these factors. Therefore, the present disclosure proposes a characteristic vector construction method for combining a time domain characteristic and a frequency domain characteristic of a noise signal of the urban rail transit vehicle. In the present disclosure, variational mode decomposition is performed on a noise signal in a fault state of the urban rail transit vehicle, and each decomposition eigenmode coefficient is extracted to convert into energy information of different frequency bands. A characteristic vector including a time domain statistical characteristic and variational mode decomposition eigenmode energy information is constructed, and normalization processing is performed; and a support vector machine intelligent recognition model based on the foregoing characteristic vector is constructed, to recognize a rail corrugation state in urban rail transit, and recognize a fault frequency characteristic and a severity characteristic of the urban rail transit vehicle.

Other mechanical structures tend to have a fixed rotation frequency in a specified working time period, that is, a speed is a constant value, but wheel-rail noise of the urban rail transit vehicle is significantly unstable because of frequent traction and braking, a complex line condition, and a local characteristic of rail corrugation.

In comparison with a traditional technology in which rail corrugation analysis trolley CAT is used for detection and recognition, in the method in the present disclosure, after a support vector machine is trained, only wheel-rail noise information needs to be collected subsequently, and the wheel-rail noise information is input into a computer with the support vector machine model after specific training for processing, so that rail corrugation can be quickly and efficiently recognized.

Further, the preprocessing each piece of segmented wheel-rail noise time domain information, and extracting a time domain statistical characteristic quantity and frequency domain eigenmode energy of each piece of segmented wheel-rail noise time domain information specifically includes:

preprocessing each piece of segmented wheel-rail noise time domain information, removing abnormal data, and extracting the time domain statistical characteristic quantity of each piece of segmented wheel-rail noise time domain information; and performing variational mode decomposition on each piece of segmented wheel-rail noise time domain information by using a variational mode decomposition method, and extracting each decomposition eigenmode coefficient to convert into frequency domain eigenmode energy of different frequency bands.

Further, the time domain statistical characteristic quantity includes a total wheel-rail noise value, a wheel-rail noise root mean square value, a wheel-rail noise average amplitude, a wheel-rail noise variance, and wheel-rail noise power information.

Further, each piece of segmented wheel-rail noise data is classified and marked according to measured corrugation data and wheel-rail noise data, to obtain a rail normal state label and a rail corrugated state label.

Further, the multi-dimensional wheel-rail noise characteristic vector is a multi-dimensional characteristic vector composed of a rail state label, and a time domain statistical characteristic quantity and frequency domain eigenmode energy of wheel-rail noise; and the multi-dimensional wheel-rail noise characteristic vector is represented as {rail state label; time domain statistical characteristic quantity of wheel-rail noise; frequency domain eigenmode energy of wheel-rail noise}.

Specifically, for a dichotomous problem, when there is no corrugation, a label value is −1; and when there is corrugation, a label value is +1 (taking ±1 as an example, two labels do not have a same value for dichotomy). A time domain statistical characteristic of wheel-rail noise includes but is not limited to {total wheel-rail noise value, wheel-rail noise root mean square value, wheel-rail noise average amplitude, wheel-rail noise variance, and wheel-rail noise power information}.

Further, the training the rail corrugation state recognition model based on a support vector machine includes:

composing the multi-dimensional wheel-rail noise characteristic vector into an eigenspace, and dividing the eigenspace into a training set and a validation set, where the training set is used to search for an optimal parameter and a training model, and the validation set is used to validate reliability of a trained model; and specifically, two thirds to four fifths of samples in the eigenspace are generally used as a training set, and the remaining samples are used as a training set;

inputting the training set into the rail corrugation state recognition model based on a support vector machine, and searching for an optimal model parameter through cross validation and parameter optimization;

using the optimal model parameter as an input parameter of a training model, and inputting the training set to a left-right parameter model for training, to obtain an optimal parameter support vector machine classifier model; and inputting the validation set into the optimal parameter support vector machine classifier model to validate a model, where the cross validation and the parameter optimization are performed simultaneously, the cross validation is set to n-fold cross validation, and a training set is divided into n pieces, where one piece is used as a validation set, and the remaining n−1 pieces are used as a training set for model training; this process is performed n times, one validation set is changed each time, and the remaining n−1 pieces are used as a training set; and an algorithm for the parameter optimization can adopt a plurality of methods such as grid search, a genetic algorithm, or particle swarm optimization.

Further, to-be-recognized wheel-rail noise data is recognized by using the rail corrugation state recognition model based on a support vector machine, to obtain a rail corrugation state. That is, a measured data characteristic vector of an unknown label is input into the optimal parameter support vector machine classifier model for intelligent recognition.

Further, the wheel-rail noise signal is a specified wheel-rail noise signal generated when an urban rail transit vehicle moves at an uneven speed along a rail.

Further, the wheel-rail noise signal is collected by using a noise signal collector, the noise signal collector is disposed in a wheel-rail region of a train, and noise signal collectors are disposed in both a left wheel-rail region and a right wheel-rail region of a train. In this way, rail corrugation on both sides is detected to ensure that noise information is more perfect.

According to a second aspect, the present disclosure further provides a rail corrugation recognition apparatus based on a support vector machine, where the apparatus supports the rail corrugation recognition method based on a support vector machine, and the apparatus includes:

an obtaining unit, configured to obtain wheel-rail noise signals in different time periods, where the wheel-rail noise signal is a specified wheel-rail noise signal generated when an urban rail transit vehicle moves at an uneven speed along a rail;

a wheel-rail noise time domain information unit, configured to obtain wheel-rail noise time domain information according to the wheel-rail noise signal;

a segmented wheel-rail noise time domain information unit, configured to divide the wheel-rail noise time domain information into segmented wheel-rail noise time domain information corresponding to each of the different time periods, and ensure that each piece of segmented wheel-rail noise time domain information corresponds to an equal length of a moving path of an urban rail transit vehicle;

a characteristic extraction unit, configured to preprocess each piece of segmented wheel-rail noise time domain information, and extract a time domain statistical characteristic quantity and frequency domain eigenmode energy of each piece of segmented wheel-rail noise time domain information;

a multi-dimensional wheel-rail noise characteristic vector unit, configured to obtain a multi-dimensional wheel-rail noise characteristic vector according to the time domain statistical characteristic quantity and the frequency domain eigenmode energy;

a model constructing and training unit, configured to construct a rail corrugation state recognition model based on a support vector machine according to the multi-dimensional wheel-rail noise characteristic vector, and train the rail corrugation state recognition model based on a support vector machine; and a rail corrugation state recognition unit, configured to recognize to-be-recognized wheel-rail noise data by using the rail corrugation state recognition model based on a support vector machine, to obtain a rail corrugation state, where the rail corrugation state includes a rail corrugation-free state and a rail corrugated state.

According to a third aspect, the present disclosure further provides a computer device, including a memory, a processor, and a computer program stored in the memory and running on the processor, where when the computer program is executed by the processor, the rail corrugation recognition method based on a support vector machine is implemented.

According to a fourth aspect, the present disclosure further provides a computer-readable storage medium, where the computer-readable storage medium stores a computer program, and when the computer program is executed by a processor, the rail corrugation recognition method based on a support vector machine is implemented.

Compared with the prior art, the present disclosure has the following advantages and beneficial effects:

In comparison with a traditional technology in which rail corrugation analysis trolley CAT is used for detection and recognition, in the rail corrugation recognition method and apparatus based on a support vector machine, the device, and the medium in the present disclosure, a characteristic vector is extracted from collected specific wheel-rail noise information generated when an urban rail transit vehicle moves at an uneven speed along a rail, and a support vector machine binary classification model is constructed; and after a support vector machine is trained, only wheel-rail noise information needs to be collected subsequently, and the wheel-rail noise information is input into a computer with the support vector machine model after specific training for processing, so that rail corrugation can be quickly, efficiently and accurately recognized. The present disclosure can implement real-time on-line detection of rail corrugation, with the advantages of high efficiency, accuracy, high speed, and low operation and maintenance costs, thereby promoting the development of operation and maintenance of rail transit towards convenience, intelligence, and efficiency.

BRIEF DESCRIPTION OF THE DRAWINGS

The drawings described herein are provided for further understanding on the embodiments of the present disclosure, and constitute a part of the present application rather than a limit to the embodiments of the present disclosure. In the accompanying drawings.

Figure 1:
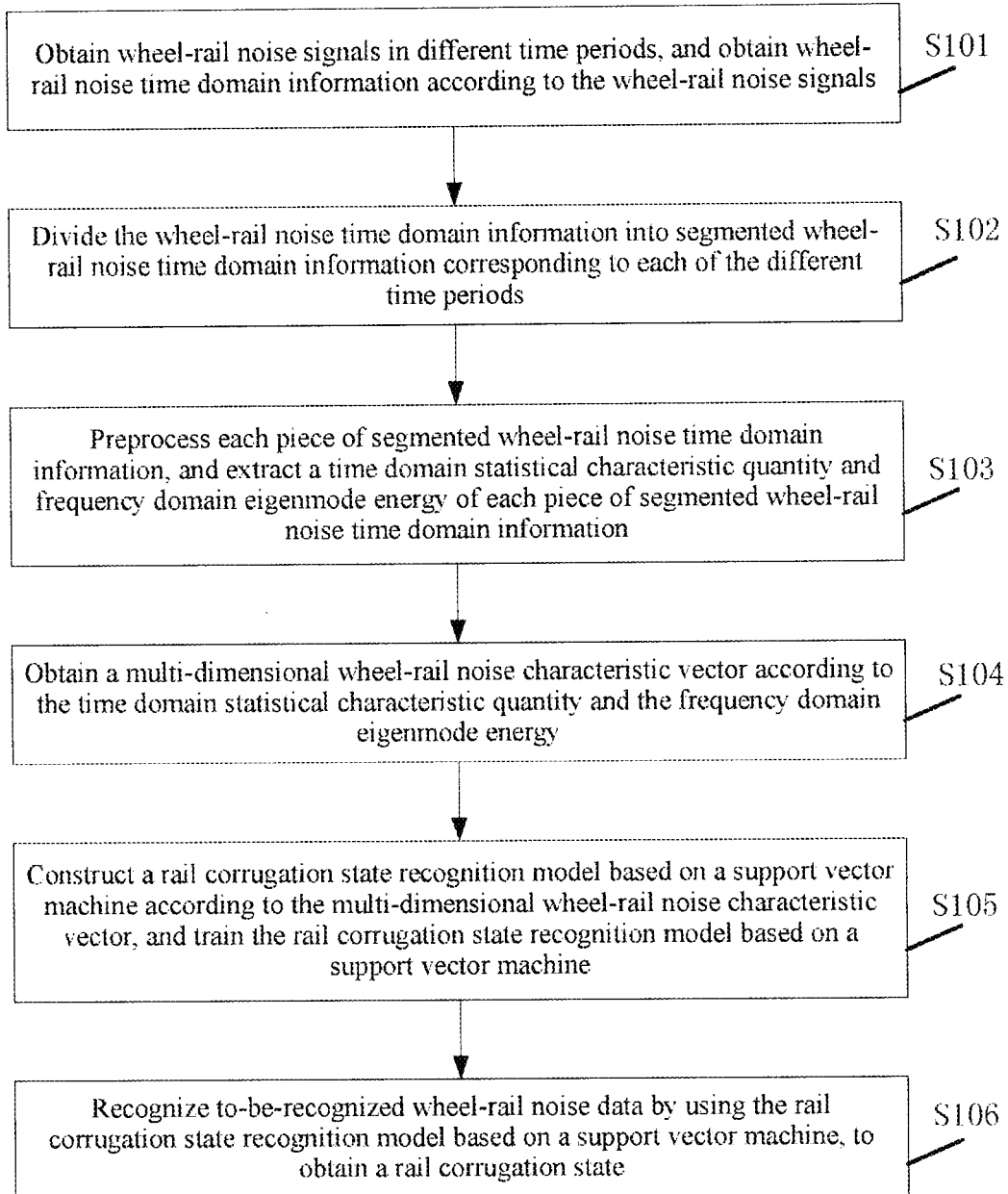
FIG. 1 is a flowchart of a rail corrugation recognition method based on a support vector machine according to the present disclosure.
Figure 2:
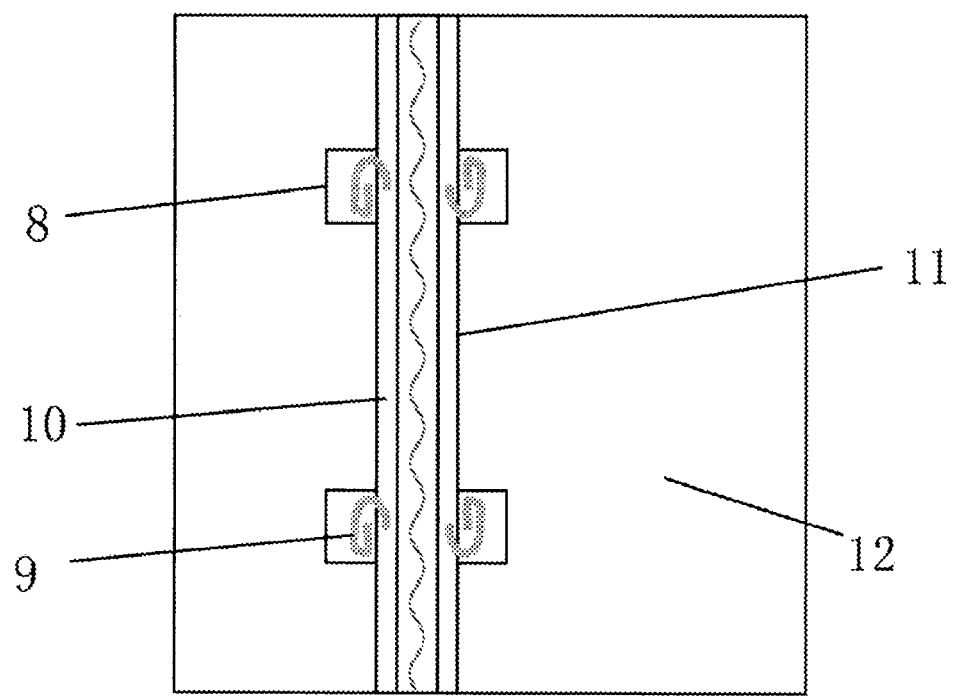
FIG. 2 is a schematic diagram of rail corrugation in urban rail transit according to the present disclosure.

DESCRIPTION OF REFERENCE NUMERALS 1, obtaining unit; 2, wheel-rail noise time domain information unit; 3, segmented wheel-rail noise time domain information unit; 4, characteristic extraction unit; 5, multi-dimensional wheel-rail noise characteristic vector unit; 6, model constructing and training unit; 7, rail corrugation state recognition unit; 8, sleeper; 9, fastener; 10, rail; 11, rail corrugation; 12, track slab; 13, bogie frame; 14, arm; 15, wheel; 16, axle box; 17, primary suspension.

DETAILED DESCRIPTION OF THE EMBODIMENTS

In order to make the objectives, technical solutions and advantages of the present disclosure more apparent, the present disclosure will be further described in detail below with reference to the embodiments and drawing. The exemplary implementations and descriptions thereof in the present disclosure are only used to explain the present disclosure, rather than to limit the present disclosure.

Embodiment 1

Figure 3:
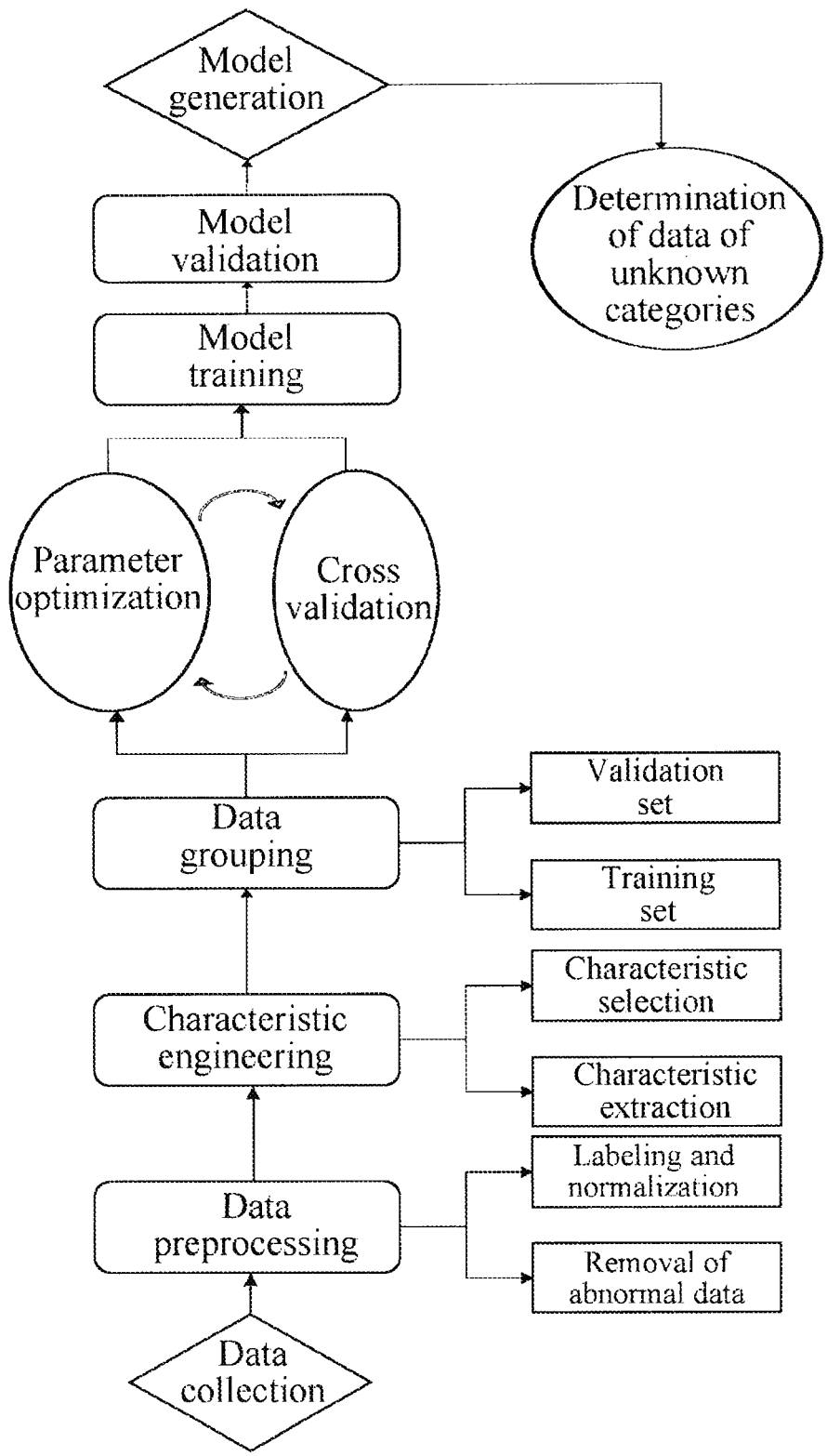
FIG. 3 is a detailed schematic flowchart of a rail corrugation recognition method based on a support vector machine according to the present disclosure.

As shown in FIG. 1 and FIG. 3, the present disclosure provides a rail corrugation recognition method based on a support vector machine, where the method includes:

S101: obtaining wheel-rail noise signals in different time periods, and obtaining wheel-rail noise time domain information according to the wheel-rail noise signals;

S102: dividing the wheel-rail noise time domain information into segmented wheel-rail noise time domain information corresponding to each of the different time periods, and ensuring that each piece of segmented wheel-rail noise time domain information corresponds to an equal length of a moving path of an urban rail transit vehicle;

S103: preprocessing each piece of segmented wheel-rail noise time domain information, and extracting a time domain statistical characteristic quantity and frequency domain eigenmode energy of each piece of segmented wheel-rail noise time domain information;

S104: obtaining a multi-dimensional wheel-rail noise characteristic vector according to the time domain statistical characteristic quantity and the frequency domain eigenmode energy;

S105: constructing a rail corrugation state recognition model based on a support vector machine according to the multi-dimensional wheel-rail noise characteristic vector, and training the rail corrugation state recognition model based on a support vector machine; and S106: recognizing to-be-recognized wheel-rail noise data by using the rail corrugation state recognition model based on a support vector machine, to obtain a rail corrugation state, where the rail corrugation state includes a rail corrugation-free state and a rail corrugated state.

In this embodiment, the preprocessing each piece of segmented wheel-rail noise time domain information, and extracting a time domain statistical characteristic quantity and frequency domain eigenmode energy of each piece of segmented wheel-rail noise time domain information specifically includes:

preprocessing each piece of segmented wheel-rail noise time domain information, removing abnormal data, and extracting the time domain statistical characteristic quantity of each piece of segmented wheel-rail noise time domain information; and performing variational mode decomposition on each piece of segmented wheel-rail noise time domain information by using a variational mode decomposition method, and extracting each decomposition eigenmode coefficient to convert into frequency domain eigenmode energy of different frequency bands.

In this embodiment, the time domain statistical characteristic quantity includes a total wheel-rail noise value, a wheel-rail noise root mean square value, a wheel-rail noise average amplitude, a wheel-rail noise variance, and wheel-rail noise power information.

In this embodiment, each piece of segmented wheel-rail noise data is classified and marked according to measured corrugation data and wheel-rail noise data, to obtain a rail normal state label and a rail corrugated state label.

In this embodiment, the multi-dimensional wheel-rail noise characteristic vector is a multi-dimensional characteristic vector composed of a rail state label, and a time domain statistical characteristic quantity and frequency domain eigenmode energy of wheel-rail noise; and the multi-dimensional wheel-rail noise characteristic vector is represented as {rail state label; time domain statistical characteristic quantity of wheel-rail noise; frequency domain eigenmode energy of wheel-rail noise}.

Specifically, for a dichotomous problem, when there is no corrugation, a label value is −1; and when there is corrugation, a label value is +1 (taking ±1 as an example, two labels do not have a same value for dichotomy). A time domain statistical characteristic of wheel-rail noise includes but is not limited to {total wheel-rail noise value, wheel-rail noise root mean square value, wheel-rail noise average amplitude, wheel-rail noise variance, and wheel-rail noise power information}.

In this embodiment, the training the rail corrugation state recognition model based on a support vector machine includes:

composing the multi-dimensional wheel-rail noise characteristic vector into an eigenspace, and dividing the eigenspace into a training set and a validation set, where the training set is used to search for an optimal parameter and a training model, and the validation set is used to validate reliability of a trained model; and specifically, two thirds to four fifths of samples in the eigenspace are generally used as a training set, and the remaining samples are used as a training set;

inputting the training set into the rail corrugation state recognition model based on a support vector machine, and searching for an optimal model parameter through cross validation and parameter optimization;

using the optimal model parameter as an input parameter of a training model, and inputting the training set to a left-right parameter model for training, to obtain an optimal parameter support vector machine classifier model; and inputting the validation set into the optimal parameter support vector machine classifier model to validate a model, where the cross validation and the parameter optimization are performed simultaneously, the cross validation is set to n-fold cross validation, and a training set is divided into n pieces, where one piece is used as a validation set, and the remaining n−1 pieces are used as a training set for model training; this process is performed n times, one validation set is changed each time, and the remaining n−1 pieces are used as a training set; and an algorithm for the parameter optimization can adopt a plurality of methods such as grid search, a genetic algorithm, or particle swarm optimization.

In this embodiment, to-be-recognized wheel-rail noise data is recognized by using the rail corrugation state recognition model based on a support vector machine, to obtain a rail corrugation state. That is, a measured data characteristic vector of an unknown label is input into the optimal parameter support vector machine classifier model for intelligent recognition.

In this embodiment, the wheel-rail noise signal is a specified wheel-rail noise signal generated when an urban rail transit vehicle moves at an uneven speed along a rail.

In this embodiment, the wheel-rail noise signal is collected by using a noise signal collector, the noise signal collector is disposed in a wheel-rail region of a train, and noise signal collectors are disposed in both a left wheel-rail region and a right wheel-rail region of a train. In this way, rail corrugation on both sides is detected to ensure that noise information is more perfect.

An operating principle is as follows: In the present disclosure, time domain statistical characteristics of noise signals generated when an urban rail transit vehicle moves at an uneven speed along a rail 10 in a fault state and a normal state are significantly different, and the time domain statistical characteristics have a strong ability to distinguish states of the urban rail transit vehicle. However, the time domain statistical characteristics are affected by many factors, such as a running speed and an operating environment of the urban rail transit vehicle, and frequency domain characteristics of noise signals in different states of the urban rail transit vehicle are less affected by these factors. Therefore, the present disclosure proposes a characteristic vector construction method for combining a time domain characteristic and a frequency domain characteristic of a noise signal of the urban rail transit vehicle. In the present disclosure, variational mode decomposition is performed on a noise signal in a fault state of the urban rail transit vehicle, and each decomposition eigenmode coefficient is extracted to convert into energy information of different frequency bands. A characteristic vector including a time domain statistical characteristic and variational mode decomposition eigenmode energy information is constructed, and normalization processing is performed; and a support vector machine intelligent recognition model based on the foregoing characteristic vector is constructed, to recognize a rail corrugation state in urban rail transit, and recognize a fault frequency characteristic and a severity characteristic of the urban rail transit vehicle.

Other mechanical structures tend to have a fixed rotation frequency in a specified working time period, that is, a speed is a constant value, but wheel-rail noise of the urban rail transit vehicle is significantly unstable because of frequent traction and braking, a complex line condition, and a local characteristic of rail corrugation.

In comparison with a traditional technology in which rail corrugation analysis trolley CAT is used for detection and recognition, in the method in the present disclosure, after a support vector machine is trained, only wheel-rail noise information needs to be collected subsequently, and the wheel-rail noise information is input into a computer with the support vector machine model after specific training for processing, so that rail corrugation can be quickly and efficiently recognized.

Embodiment 2

As shown in FIG. 1 to FIG. 8, a difference between this embodiment and Embodiment 1 lies in that this embodiment is based on the rail corrugation recognition method based on a support vector machine in Embodiment 1 and is implemented as follows:

The following six steps are performed: (1) Data is classified and labelled according to measured wheel-rail noise and rail corrugation 11 of an urban rail transit vehicle. (2) A time domain statistical characteristic of time domain wheel-rail noise is extracted; (3) Variational mode decomposition is performed on the time domain wheel-rail noise, and eigenmode energy is calculated. (4) A multi-dimensional characteristic vector {rail state label; time domain statistical characteristic quantity of wheel-rail noise; frequency domain eigenmode energy of wheel-rail noise} is constructed and normalized; (5) Samples are classified into a training set and a test set, where the training set is used for parameter optimization and model training of a support vector machine, and the test set is used to test reliability of a model; (6) Intelligent recognition is performed on wheel-rail noise of an unknown label.

The device used in the method of the present disclosure includes:
  a noise signal collector, where the noise signal collector is disposed on a vehicle, and is configured to obtain vehicle wheel-rail noise information;
  a data collection system, where the data collection system is connected to the noise signal collector, and is configured to collect the vehicle wheel-rail noise information collected by the noise signal collector, and the data collection system is a multi-channel data collection system; and
  a data processing apparatus, where the data processing apparatus is connected to the data collection system, and is configured to process the data received by the data collection system, and recognize a rail corrugation state after the vehicle wheel-rail noise information is processed.

The noise signal collector is a noise sensor. The noise sensor is disposed in a wheel-rail region of a train. Noise sensors are disposed in both a left wheel-rail region and a right wheel-rail region of a train. In this way, rail corrugation 11 on both sides is detected to ensure that noise information is more perfect.

The following uses examples for implementations:
(1) Data Description

Figure 4:
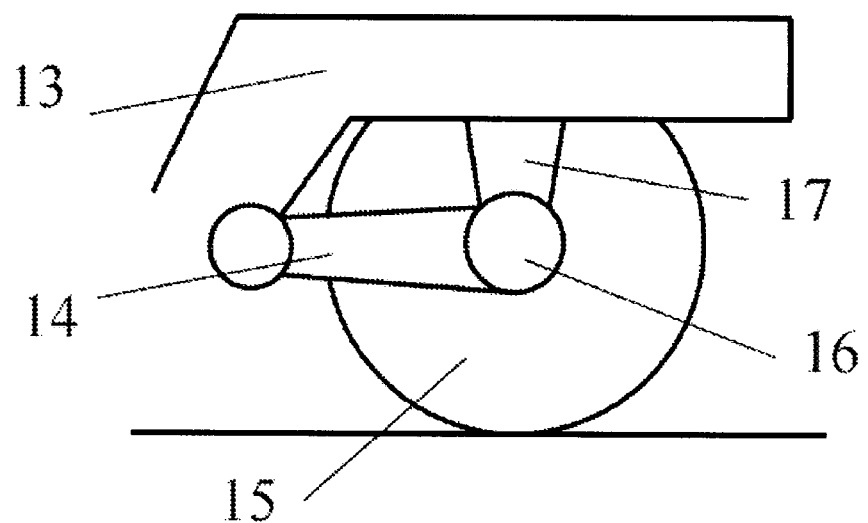
FIG. 4 is a schematic diagram illustrating wheel-rail noise testing for an urban rail transit vehicle according to the present disclosure.

An on-site test is performed on a subway line in a city in China, and a B&K multi-channel data collection system is used to obtain a vehicle wheel-rail noise signal, as shown in FIG. 4.

(2) Wheel-Rail Noise Classification Label

A wheel-rail noise time domain signal obtained through the test is divided into segmented noise time domain information corresponding to each of different time periods according to the foregoing method, and it is ensured that each piece of segmented noise time domain information corresponds to an equal length of a moving path of an urban rail transit vehicle, thereby forming a sample space; and sample data in the sample space is labeled with reference to an actual situation.

(3) Extraction of a Time Domain Statistical Characteristic of Wheel-Rail Noise

A time domain statistical characteristic of each piece of sample noise is extracted, including {total wheel-rail noise value, wheel-rail noise root mean square value, wheel-rail noise average amplitude, wheel-rail noise variance, and wheel-rail noise power}.

(4) Variational Mode Decomposition on Wheel-Rail Noise

Figure 6:
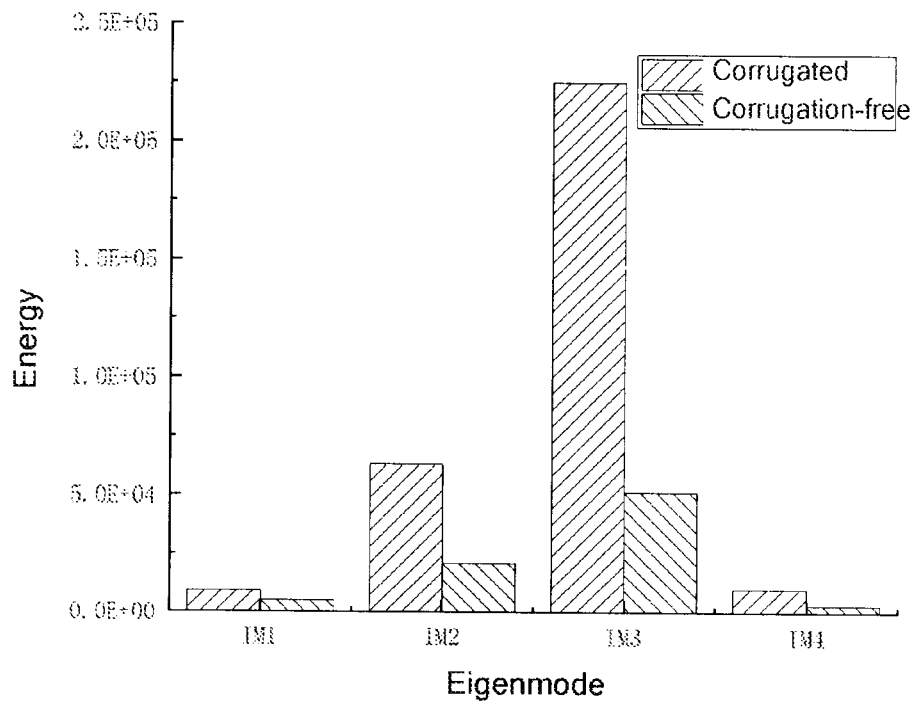
FIG. 6 is a schematic comparison diagram of eigenmode energy in variational mode decomposition of wheel-rail noise in a rail corrugated state and a corrugation-free state according to an embodiment of the present disclosure.

All sample wheel-rail noise signals are decomposed by using a variational mode method, an eigenmode quantity is determined according to a spectrum characteristic of wheel-rail noise, and eigenmode energy is calculated, as shown in FIG. 6.

(5) Construction of an Eigenspace

Figure 5:
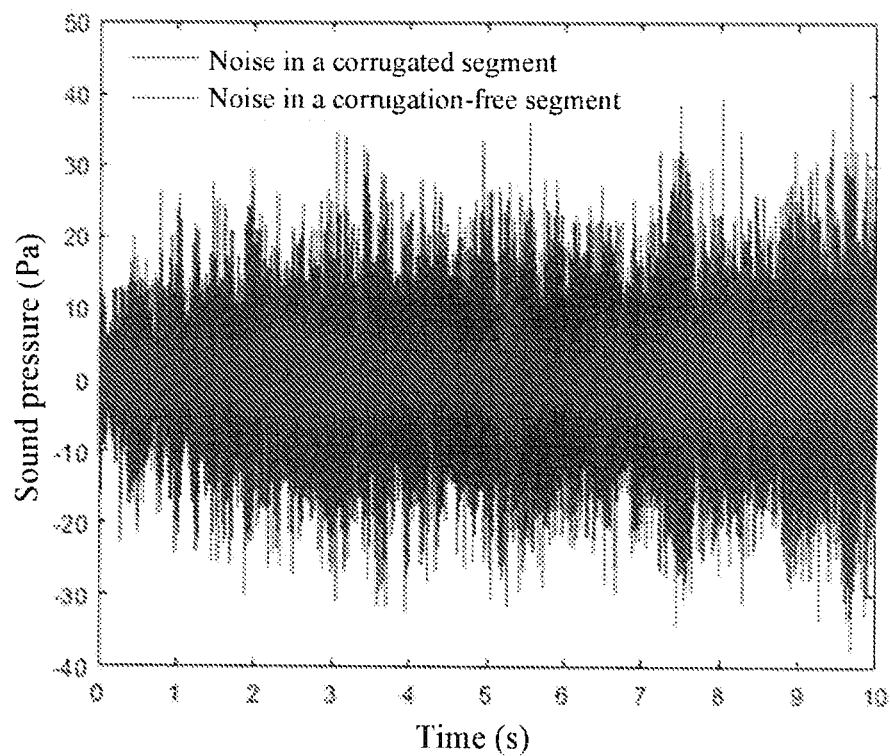
FIG. 5 is a schematic comparison diagram of time domain signals of wheel-rail noise in a rail corrugated state and a corrugation-free state according to an embodiment of the present disclosure.

For the processed samples, a multi-dimensional characteristic vector $\{\pm 1$; total noise value$_i$, root mean square value$_i$, average amplitude$_i$, variance$_i$, power$_i$; $E_{i1}, E_{i2}, E_{i3}, \ldots, E_{in}\}$ is constructed and normalized to form an eigenspace, where i is the $i^{th}$ sample, and n is an eigenmode quantity, as shown in FIG. 5.

(6) Division of a Sample Space

2/3 to 4/5 samples in the sample space are randomly used as a training set, and the remaining samples are used as a test set.

(7) Model Training

Figure 7:
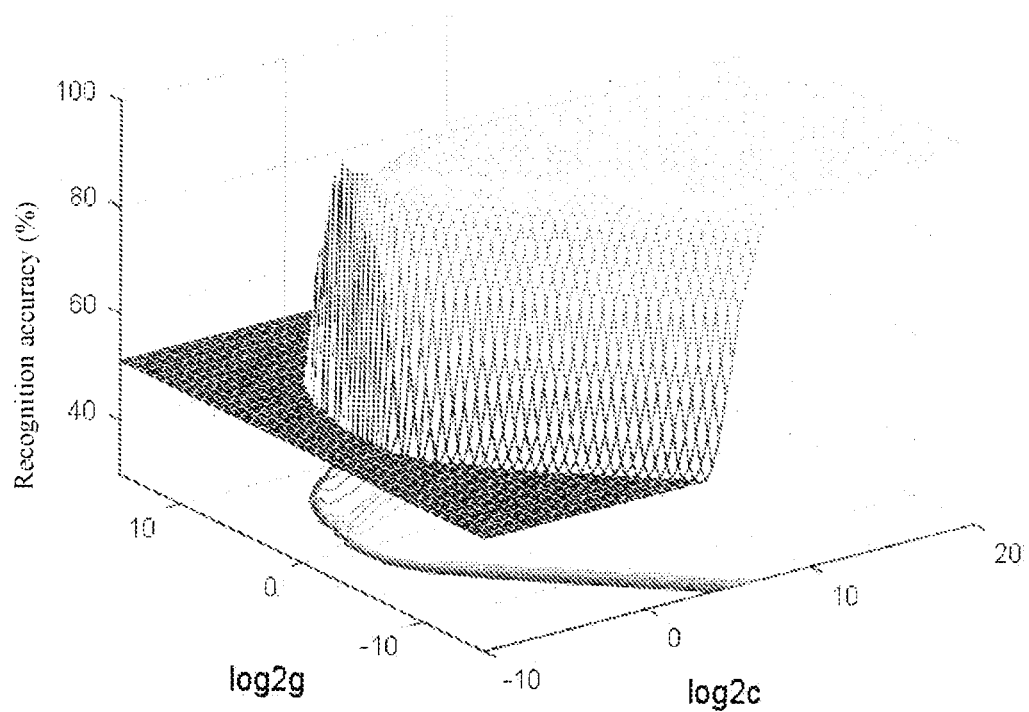
FIG. 7 is a schematic result diagram of parameter optimization of a support vector machine according to an embodiment of the present disclosure.

The training set is input into a model for parameter optimization and cross validation to obtain an optimal model parameter, and the model is re-trained by using the optimal model parameter, as shown in FIG. 7.

(8) Model Validation

Figure 8:
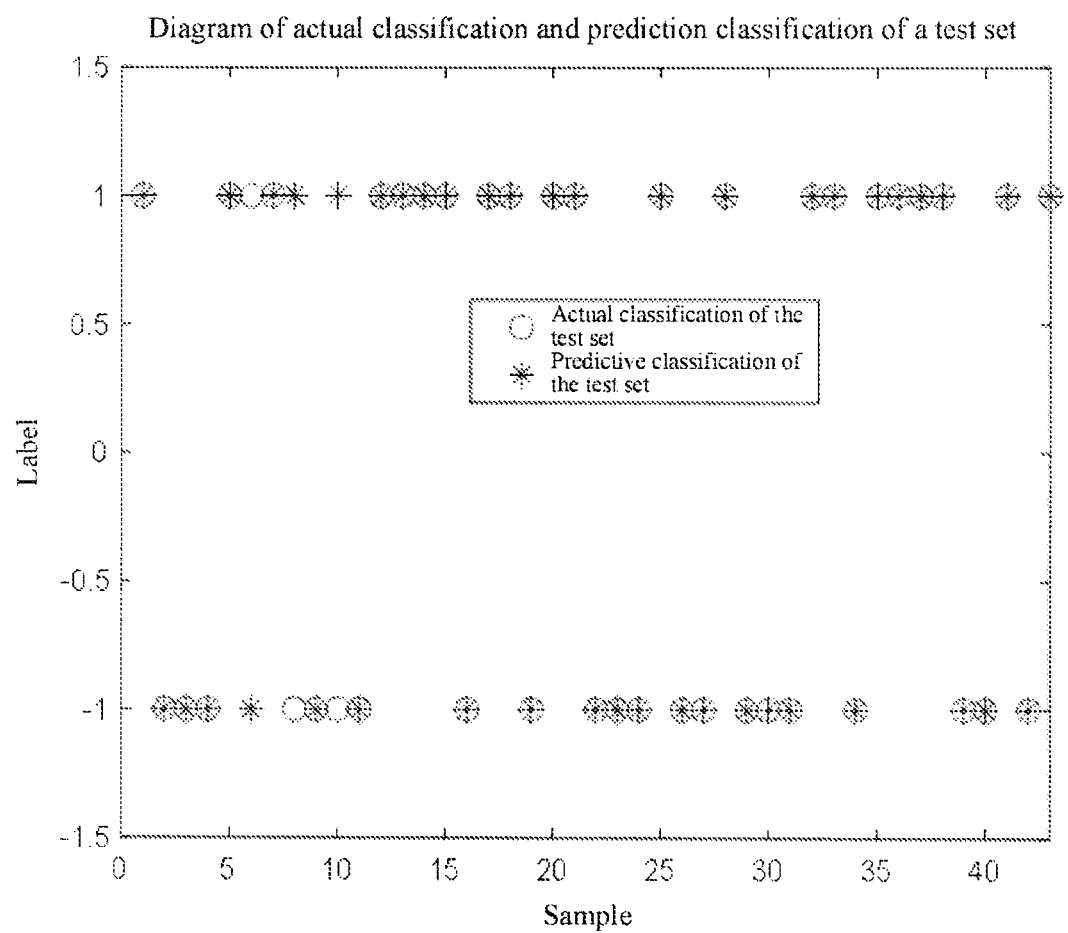
FIG. 8 is a schematic result diagram of predictive classification of a test set of a support vector machine according to an embodiment of the present disclosure.

The test set is input into a trained support vector machine model to test reliability of a model, as shown in FIG. 8.

(9) Intelligent Rail Corrugation Recognition Based on a Support Vector Machine

A sample of an unknown label is input into the support vector machine model to intelligently recognize a rail corrugation state.

Embodiment 3

Figure 9:
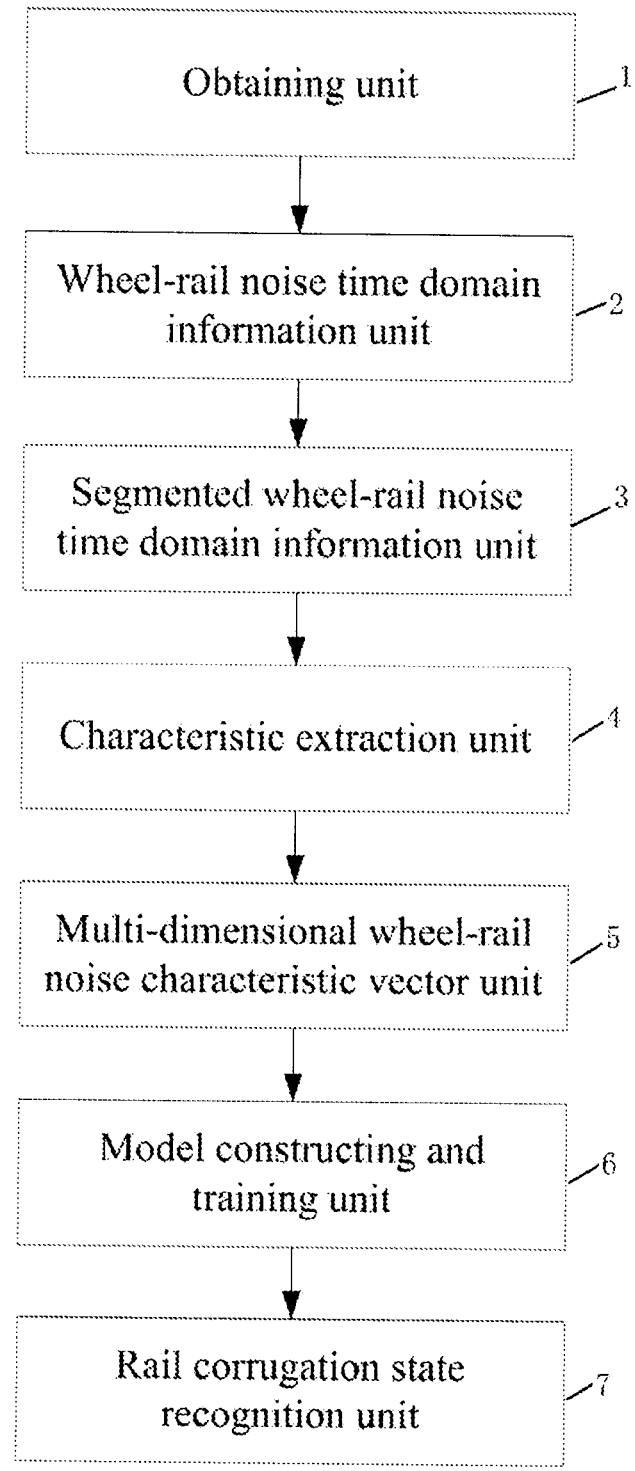
FIG. 9 is a flowchart of a rail corrugation recognition apparatus based on a support vector machine according to the present disclosure.

As shown in FIG. 9, a difference between this embodiment and Embodiment 1 lies in that this embodiment provides a rail corrugation recognition apparatus based on a support vector machine, where the apparatus supports the rail corrugation recognition method based on a support vector machine in Embodiment 1, and the apparatus includes:

an obtaining unit 1, configured to obtain wheel-rail noise signals in different time periods, where the wheel-rail noise signal is a specified wheel-rail noise signal generated when an urban rail transit vehicle moves at an uneven speed along a rail 10;

a wheel-rail noise time domain information unit 2, configured to obtain wheel-rail noise time domain information according to the wheel-rail noise signal;

a segmented wheel-rail noise time domain information unit 3, configured to divide the wheel-rail noise time domain information into segmented wheel-rail noise time domain information corresponding to each of the different time periods, and ensure that each piece of segmented wheel-rail noise time domain information corresponds to an equal length of a moving path of an urban rail transit vehicle;

a characteristic extraction unit 4, configured to preprocess each piece of segmented wheel-rail noise time domain information, and extract a time domain statistical characteristic quantity and frequency domain eigenmode energy of each piece of segmented wheel-rail noise time domain information;

a multi-dimensional wheel-rail noise characteristic vector unit 5, configured to obtain a multi-dimensional wheel-rail noise characteristic vector according to the time domain statistical characteristic quantity and the frequency domain eigenmode energy;

a model constructing and training unit 6, configured to construct a rail corrugation state recognition model based on a support vector machine according to the multi-dimensional wheel-rail noise characteristic vector, and train the rail corrugation state recognition model based on a support vector machine; and a rail corrugation state recognition unit 7, configured to recognize to-be-recognized wheel-rail noise data by using the rail corrugation state recognition model based on a support vector machine, to obtain a rail corrugation state, where the rail corrugation state includes a rail corrugation-free state and a rail corrugated state.

Execution processes of the units are performed according to the steps in the procedure of the rail corrugation recognition method based on a support vector machine in Embodiment 1. Details are not described again in this embodiment.

In addition, the present disclosure further provides a computer device, including a memory, a processor, and a computer program stored in the memory and running on the processor, where when the computer program is executed by the processor, the rail corrugation recognition method based on a support vector machine is implemented.

In addition, the present disclosure further provides a computer-readable storage medium, where the computer-readable storage medium stores a computer program, and when the computer program is executed by a processor, the rail corrugation recognition method based on a support vector machine is implemented.

Those skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program codes.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

The objectives, technical solutions and beneficial effects of the present disclosure are further described in detail in the above specific implementations. It should be understood that the above descriptions are merely specific implementations of the present disclosure, but are not intended to limit the protection scope of the present disclosure. Any modification, equivalent replacement, improvement, or the like made within the spirit and principle of the present disclosure should fall within the protection scope of the present disclosure.

What is claimed is:

1. A rail corrugation recognition method based on a support vector machine, wherein the method comprises:
obtaining wheel-rail noise signals in different time periods, and obtaining wheel-rail noise time domain information according to the wheel-rail noise signals;
dividing the wheel-rail noise time domain information into segmented wheel-rail noise time domain information corresponding to each of the different time periods, wherein each piece of segmented wheel-rail noise time domain information corresponds to an equal length of a moving path of an urban rail transit vehicle;
preprocessing each piece of segmented wheel-rail noise time domain information, and extracting a time domain statistical characteristic quantity and frequency domain eigenmode energy of each piece of segmented wheel-rail noise time domain information;

obtaining a multi-dimensional wheel-rail noise characteristic vector according to the time domain statistical characteristic quantity and the frequency domain eigenmode energy;

constructing a rail corrugation state recognition model based on a support vector machine according to the multi-dimensional wheel-rail noise characteristic vector, and training the rail corrugation state recognition model based on a support vector machine; and recognizing to-be-recognized wheel-rail noise data by using the rail corrugation state recognition model based on a support vector machine, to obtain a rail corrugation state;

wherein the preprocessing each piece of segmented wheel-rail noise time domain information, and extracting a time domain statistical characteristic quantity and frequency domain eigenmode energy of each piece of segmented wheel-rail noise time domain information specifically comprises:

preprocessing each piece of segmented wheel-rail noise time domain information, removing abnormal data, and extracting the time domain statistical characteristic quantity of each piece of segmented wheel-rail noise time domain information; and performing variational mode decomposition on each piece of segmented wheel-rail noise time domain information by using a variational mode decomposition method, and extracting each decomposition eigenmode coefficient to convert into frequency domain eigenmode energy of different frequency bands.

2. The rail corrugation recognition method based on a support vector machine according to claim 1, wherein the time domain statistical characteristic quantity comprises a total wheel-rail noise value, a wheel-rail noise root mean square value, a wheel-rail noise average amplitude, a wheel-rail noise variance, and wheel-rail noise power information.

3. The rail corrugation recognition method based on a support vector machine according to claim 1, wherein the multi-dimensional wheel-rail noise characteristic vector is a multi-dimensional characteristic vector composed of a rail state label, and a time domain statistical characteristic quantity and frequency domain eigenmode energy of wheel-rail noise; and the multi-dimensional wheel-rail noise characteristic vector is represented as {rail state label; time domain statistical characteristic quantity of wheel-rail noise; frequency domain eigenmode energy of wheel-rail noise}.

4. The rail corrugation recognition method based on a support vector machine according to claim 1, wherein the training the rail corrugation state recognition model based on a support vector machine comprises:

composing the multi-dimensional wheel-rail noise characteristic vector into an eigenspace, and dividing the eigenspace into a training set and a validation set, wherein the training set is used to search for an optimal parameter and a training model, and the validation set is used to validate reliability of a trained model;

inputting the training set into the rail corrugation state recognition model based on a support vector machine, and searching for an optimal model parameter through cross validation and parameter optimization;

using the optimal model parameter as an input parameter of a training model, and inputting the training set to a left-right parameter model for training, to obtain an optimal parameter support vector machine classifier model; and inputting the validation set into the optimal parameter support vector machine classifier model to validate a model, wherein the cross validation and the parameter optimization are performed simultaneously, the cross validation is set to n-fold cross validation, and a training set is divided into n pieces, wherein one piece is used as a validation set, and the remaining n−1 pieces are used as a training set for model training; this process is performed n times, one validation set is changed each time, and the remaining n−1 pieces are used as a training set; and an algorithm for the parameter optimization adopts grid search, a genetic algorithm, or particle swarm optimization.

5. The rail corrugation recognition method based on a support vector machine according to claim 1, wherein the wheel-rail noise signal is a wheel-rail noise signal generated when an urban rail transit vehicle moves at an uneven speed along a rail.

6. The rail corrugation recognition method based on a support vector machine according to claim 5, wherein the wheel-rail noise signal is collected by using a noise signal collector, the noise signal collector is disposed in a wheel-rail region of a train, and noise signal collectors are disposed in both a left wheel-rail region and a right wheel-rail region of a train.

7. A computer device, comprising a memory, a processor, and a computer program stored in the memory and running on the processor, wherein when the computer program is executed by the processor, a rail corrugation recognition method based on a support vector machine is implemented; wherein the method comprises:

obtaining wheel-rail noise signals in different time periods, and obtaining wheel-rail noise time domain information according to the wheel-rail noise signals;

dividing the wheel-rail noise time domain information into segmented wheel-rail noise time domain information corresponding to each of the different time periods, wherein each piece of segmented wheel-rail noise time domain information corresponds to an equal length of a moving path of an urban rail transit vehicle;

preprocessing each piece of segmented wheel-rail noise time domain information, and extracting a time domain statistical characteristic quantity and frequency domain eigenmode energy of each piece of segmented wheel-rail noise time domain information;

obtaining a multi-dimensional wheel-rail noise characteristic vector according to the time domain statistical characteristic quantity and the frequency domain eigenmode energy;

constructing a rail corrugation state recognition model based on a support vector machine according to the multi-dimensional wheel-rail noise characteristic vector, and training the rail corrugation state recognition model based on a support vector machine; and recognizing to-be-recognized wheel-rail noise data by using the rail corrugation state recognition model based on a support vector machine, to obtain a rail corrugation state;

wherein the preprocessing each piece of segmented wheel-rail noise time domain information, and extracting a time domain statistical characteristic quantity and frequency domain eigenmode energy of each piece of segmented wheel-rail noise time domain information specifically comprises:

preprocessing each piece of segmented wheel-rail noise time domain information, removing abnormal data, and extracting the time domain statistical characteristic quantity of each piece of segmented wheel-rail noise time domain information; and performing variational mode decomposition on each piece of segmented wheel-rail noise time domain information by using a variational mode decomposition method, and extracting each decomposition eigenmode coefficient to convert into frequency domain eigenmode energy of different frequency bands.

8. The computer device according to claim 7, wherein the time domain statistical characteristic quantity comprises a total wheel-rail noise value, a wheel-rail noise root mean square value, a wheel-rail noise average amplitude, a wheel-rail noise variance, and wheel-rail noise power information.

9. The computer device according to claim 7, wherein the multi-dimensional wheel-rail noise characteristic vector is a multi-dimensional characteristic vector composed of a rail state label, and a time domain statistical characteristic quantity and frequency domain eigenmode energy of wheel-rail noise; and the multi-dimensional wheel-rail noise characteristic vector is represented as {rail state label; time domain statistical characteristic quantity of wheel-rail noise; frequency domain eigenmode energy of wheel-rail noise}.

10. The computer device according to claim 7, wherein the training the rail corrugation state recognition model based on a support vector machine comprises:

composing the multi-dimensional wheel-rail noise characteristic vector into an eigenspace, and dividing the eigenspace into a training set and a validation set, wherein the training set is used to search for an optimal parameter and a training model, and the validation set is used to validate reliability of a trained model;

inputting the training set into the rail corrugation state recognition model based on a support vector machine, and searching for an optimal model parameter through cross validation and parameter optimization;

using the optimal model parameter as an input parameter of a training model, and inputting the training set to a left-right parameter model for training, to obtain an optimal parameter support vector machine classifier model; and inputting the validation set into the optimal parameter support vector machine classifier model to validate a model, wherein the cross validation and the parameter optimization are performed simultaneously, the cross validation is set to n-fold cross validation, and a training set is divided into n pieces, wherein one piece is used as a validation set, and the remaining n−1 pieces are used as a training set for model training; this process is performed n times, one validation set is changed each time, and the remaining n−1 pieces are used as a training set; and an algorithm for the parameter optimization adopts grid search, a genetic algorithm, or particle swarm optimization.

11. The computer device according to claim 7, wherein the wheel-rail noise signal is a wheel-rail noise signal generated when an urban rail transit vehicle moves at an uneven speed along a rail.

12. The computer device according to claim 11, wherein the wheel-rail noise signal is collected by using a noise signal collector, the noise signal collector is disposed in a wheel-rail region of a train, and noise signal collectors are disposed in both a left wheel-rail region and a right wheel-rail region of a train.

13. A computer-readable storage medium, wherein the computer-readable storage medium stores a computer program, and when the computer program is executed by a processor, a rail corrugation recognition method based on a support vector machine is implemented;

wherein the method comprises:

obtaining wheel-rail noise signals in different time periods, and obtaining wheel-rail noise time domain information according to the wheel-rail noise signals;

dividing the wheel-rail noise time domain information into segmented wheel-rail noise time domain information corresponding to each of the different time periods, wherein each piece of segmented wheel-rail noise time domain information corresponds to an equal length of a moving path of an urban rail transit vehicle;

preprocessing each piece of segmented wheel-rail noise time domain information, and extracting a time domain statistical characteristic quantity and frequency domain eigenmode energy of each piece of segmented wheel-rail noise time domain information;

obtaining a multi-dimensional wheel-rail noise characteristic vector according to the time domain statistical characteristic quantity and the frequency domain eigenmode energy;

constructing a rail corrugation state recognition model based on a support vector machine according to the multi-dimensional wheel-rail noise characteristic vector, and training the rail corrugation state recognition model based on a support vector machine; and recognizing to-be-recognized wheel-rail noise data by using the rail corrugation state recognition model based on a support vector machine, to obtain a rail corrugation state;

wherein the preprocessing each piece of segmented wheel-rail noise time domain information, and extracting a time domain statistical characteristic quantity and frequency domain eigenmode energy of each piece of segmented wheel-rail noise time domain information specifically comprises:

preprocessing each piece of segmented wheel-rail noise time domain information, removing abnormal data, and extracting the time domain statistical characteristic quantity of each piece of segmented wheel-rail noise time domain information; and performing variational mode decomposition on each piece of segmented wheel-rail noise time domain information by using a variational mode decomposition method, and extracting each decomposition eigenmode coefficient to convert into frequency domain eigenmode energy of different frequency bands.

14. The computer-readable storage medium according to claim 13, wherein the time domain statistical characteristic quantity comprises a total wheel-rail noise value, a wheel-rail noise root mean square value, a wheel-rail noise average amplitude, a wheel-rail noise variance, and wheel-rail noise power information.

15. The computer-readable storage medium according to claim 13, wherein the multi-dimensional wheel-rail noise characteristic vector is a multi-dimensional characteristic vector composed of a rail state label, and a time domain statistical characteristic quantity and frequency domain eigenmode energy of wheel-rail noise; and the multi-dimensional wheel-rail noise characteristic vector is represented as {rail state label; time domain statistical characteristic quantity of wheel-rail noise; frequency domain eigenmode energy of wheel-rail noise}.

16. The computer-readable storage medium according to claim 13, wherein the training the rail corrugation state recognition model based on a support vector machine comprises:

composing the multi-dimensional wheel-rail noise characteristic vector into an eigenspace, and dividing the eigenspace into a training set and a validation set, wherein the training set is used to search for an optimal parameter and a training model, and the validation set is used to validate reliability of a trained model;

inputting the training set into the rail corrugation state recognition model based on a support vector machine, and searching for an optimal model parameter through cross validation and parameter optimization;

using the optimal model parameter as an input parameter of a training model, and inputting the training set to a left-right parameter model for training, to obtain an optimal parameter support vector machine classifier model; and inputting the validation set into the optimal parameter support vector machine classifier model to validate a model, wherein the cross validation and the parameter optimization are performed simultaneously, the cross validation is set to n-fold cross validation, and a training set is divided into n pieces, wherein one piece is used as a validation set, and the remaining n−1 pieces are used as a training set for model training; this process is performed n times, one validation set is changed each time, and the remaining n−1 pieces are used as a training set; and an algorithm for the parameter optimization adopts grid search, a genetic algorithm, or particle swarm optimization.

17. The computer-readable storage medium according to claim 13, wherein the wheel-rail noise signal is a wheel-rail noise signal generated when an urban rail transit vehicle moves at an uneven speed along a rail.

* * * * *